US012559110B2

(12) United States Patent
Casselgren

(10) Patent No.: US 12,559,110 B2
(45) Date of Patent: Feb. 24, 2026

(54) METHOD AND ARRANGEMENT FOR DETERMINING A CONDITION OF A ROAD SURFACE

(71) Applicant: Klimator AB, Gothenburg (SE)

(72) Inventor: Johan Casselgren, Luleå (SE)

(73) Assignee: KLIMATOR AB, Gothenburg (SE)

( * ) Notice: Subject to any disclaimer, the term of this patent is extended or adjusted under 35 U.S.C. 154(b) by 226 days.

(21) Appl. No.: 18/548,311

(22) PCT Filed: Mar. 2, 2022

(86) PCT No.: PCT/SE2022/050209
§ 371 (c)(1),
(2) Date: Aug. 29, 2023

(87) PCT Pub. No.: WO2022/186758
PCT Pub. Date: Sep. 9, 2022

(65) Prior Publication Data
US 2024/0140441 A1 May 2, 2024

(30) Foreign Application Priority Data
Mar. 2, 2021 (SE) .................................... 2150236-4

(51) Int. Cl.
*B60W 40/06* (2012.01)
*G01S 17/86* (2020.01)
(Continued)

(52) U.S. Cl.
CPC ............. *B60W 40/06* (2013.01); *G01S 17/86* (2020.01); *G01S 17/88* (2013.01); *G06T 5/50* (2013.01);
(Continued)

(58) Field of Classification Search
CPC ........ G02S 17/86; G02S 17/88; G02S 17/931; G08B 19/02
See application file for complete search history.

(56) References Cited

U.S. PATENT DOCUMENTS 10,508,952 B1   12/2019 Rennó et al.
10,845,803 B2   11/2020 Sidle et al.
(Continued)

FOREIGN PATENT DOCUMENTS

DE   102019212668 A1   2/2021
EP       3438776 A1   2/2019
(Continued)

OTHER PUBLICATIONS

Ruiz-Llata et al., "LiDAR design for Road Condition Measurement ahead of a moving vehicle", 2017 Proceedings of IEEE Sensors, 2017, at URL: DOI: https://doi.org/10.1109/ICSENS.2017. 8234230, pp. 1-4.
(Continued)

*Primary Examiner* — Tan Q Nguyen
(74) *Attorney, Agent, or Firm* — NIXON & VANDERHYE

(57) ABSTRACT

A method for determining a classification of a condition of a road surface for vehicle traffic includes: defining a reference surface of the road surface ahead; illuminating the reference surface with a light source on the vehicle; detecting light reflected off the reference surface; and determining classification of the condition of the road surface by analyzing detected information related to the reference surface. Furthermore, the method includes: illuminating the reference surface using laser or LED light; providing image information for the reference surface by detecting the reflected light with a Lidar unit; providing further image information for the reference surface by scanning the reference surface using an RGB sensor; and classifying the road
(Continued)

surface by combining image information from the Lidar unit and the RGB sensor. The disclosure also relates to an arrangement for determining a classification of a condition of a road surface for vehicle traffic.

17 Claims, 7 Drawing Sheets

(51) Int. Cl.

| | | |
|---|---|---|
| *G01S 17/88* | (2006.01) |
| *G06T 5/50* | (2006.01) |
| *G06T 7/13* | (2017.01) |
| *G06T 7/564* | (2017.01) |
| *G06T 7/90* | (2017.01) |

(52) U.S. Cl.
CPC ............... *G06T 7/13* (2017.01); *G06T 7/564* (2017.01); *G06T 7/90* (2017.01); *B60W 2420/408* (2024.01); *G06T 2207/20221* (2013.01)

(56) References Cited

U.S. PATENT DOCUMENTS

| | | |
|---|---|---|
| 2014/0307247 A1 | 10/2014 | Zhu et al. |
| 2016/0178802 A1 | 6/2016 | Stainvas Olshansky et al. |
| 2019/0057261 A1* | 2/2019 | Tong ..................... G06V 10/454 |
| 2019/0100215 A1* | 4/2019 | Ishigami ............... B60W 30/09 |
| 2020/0391751 A1* | 12/2020 | Fujiyoshi .............. B60W 40/06 |
| 2021/0009137 A1* | 1/2021 | Herman ................ G01S 17/931 |
| 2021/0048529 A1* | 2/2021 | Roy Chowdhury ......................... B60W 40/068 |
| 2022/0032946 A1* | 2/2022 | Zhao ....................... G01S 7/417 |

FOREIGN PATENT DOCUMENTS

| | | |
|---|---|---|
| EP | 3438872 A1 | 2/2019 |
| WO | 2020176029 A1 | 9/2020 |

OTHER PUBLICATIONS

International Search Report and Written Opinion of the ISA for PCT/SE2022/050209, dated Apr. 8, 2022, 14 pages.
Swedish Search Report for SE 2150236-4, dated Oct. 25, 2021, 3 pages.
M. Ruiz-Llata et al., "LiDAR design for Road Condition Measurement ahead of a moving vehicle", 2017 IEEE Sensors, at URL: DOI: 10.1109/ICSENS.2017.8234230. (Submission Pending).
Extended European Search Report, issued in European Patent Application No. 22763687.5 dated Dec. 16, 2024.

* cited by examiner

3

11   10a   10   10   11

3

3a   12

3

3c

METHOD AND ARRANGEMENT FOR DETERMINING A CONDITION OF A ROAD SURFACE

CROSS-REFERENCE TO RELATED APPLICATIONS

This application is the US national stage of PCT/SE2022/050209, filed Mar. 2, 2022 and designating the United States, which claims the priority of SE 2150236-4, filed Mar. 2, 2021. The entire contents of each foregoing application are incorporated herein by reference.

TECHNICAL FIELD

The invention relates to a method for determining a classification of a condition of a road surface for vehicle traffic, said method comprising: defining a reference surface of said road surface ahead of the vehicle; illuminating said reference surface with at least one light source positioned on the vehicle; detecting light which is reflected off said reference surface; and determining said classification of the condition of the road surface by analyzing detected information related to said reference surface.

The invention also relates to an arrangement for determining a classification of a condition of a road surface for vehicle traffic and within a reference surface of said road surface ahead of the vehicle, said arrangement comprising at least one light source positioned on said vehicle and being configured for illuminating said reference surface; a sensor for detecting light which is reflected off said reference surface; said arrangement being configured for determining said classification of the condition of the road surface by analyzing detected information related to said reference surface.

The invention can be used for different types of measurement systems for determining the condition of a particular road, suitably but not exclusively intended to be arranged in vehicles.

BACKGROUND

In the field of road vehicle safety, there is a need for accurate information regarding the condition of various road surfaces on which vehicles are travelling. For example, it is of high importance to determine a classification of a particular road surface, i.e. whether the road surface is dry or whether it is covered with ice, snow or water, or a mixture of such conditions. In this manner, drivers of vehicles can be informed of the condition of the roads on which they intend to travel. Such information is crucial in order to minimize road accidents due to, for example, slippery road surface conditions. The provision of such information is also necessary within the field of autonomous vehicles.

For this reason, there exists a requirement to detect several types of road conditions, for example dry, wet, snowy and icy surface, on a given road surface. It is also known that several different road conditions may occur at the same time on a particular road. For example, the road may have dry wheel tracks and at the same time snow or ice in a middle section of the road. For this reason, there is a demand to provide a classification of the complete road condition which covers the entire road.

In summary, any given road section may have areas which are covered for example with snow or ice in some areas and which are dry in other areas. Such information may be important in order to provide more accurate data related to the road surface condition, i.e. in order to improve road safety.

It is particularly important to be able to detect any occurrence of so-called black ice on a road surface, i.e. clear ice which is normally transparent so that the road surface can be seen through the ice layer. There is a particularly high risk for skidding on such black ice.

It is known to use optical characteristics of a road surface to provide a classification of its condition. More precisely, the intensity of light radiation which is scattered from the road surface varies depending on the condition of the road surface. For example, there is a difference between scattering of light from a dry asphalt surface and from the same surface but covered with water or ice. This is due to the fact that dry asphalt, or asphalt covered with snow, is normally a rough surface whereas asphalt covered with water or ice is normally a smooth surface. In this way, it is possible to distinguish between dry asphalt and asphalt covered with ice or water based on light intensity.

Classification can be made based on absorption and scattering properties of the road surfaces and the materials involved. Such classification can be carried out by means of systems for measuring the light intensities of the relevant wavelengths.

Information regarding the condition of a road surface can be used in order to establish the friction of the road surface, i.e. the tire to road friction, which in turn can be used for determining, for example, the required braking distance of a vehicle during operation. This type of information is important both as regards vehicles such as cars and motorcycles, and also for commercial vehicles such as heavy transport vehicles, buses and other types of commercial and private vehicles, in order to be able to travel on such road surfaces in a safe manner.

By using updated information related to the road condition, improvements in traffic safety as well as accurate predictions of the condition of different types of road surfaces can be obtained.

In order to solve the above-mentioned requirements, it is today known to use systems and methods for determining the condition of a road surface intended for vehicle traffic. Such known systems and methods include a process of determining the road condition associated with a road surface, which can be obtained by means of a suitable road condition sensor arranged on a vehicle. For example, it is known to use an NIR camera ("near infrared" camera) for this purpose. In this manner, a classification of the road condition can be achieved, in particular for determining whether the road in question is covered with ice, snow or whether it is dry.

Even though the arrangements according to the prior art are configured for detecting different types of road conditions, there is still a need for improvements within this field of technology. In particular, there is a desire to provide a method and arrangement for methods and arrangements for determining the road condition which are more accurate and precise and which may be used to obtain information in a more detailed manner regarding the road surface to be travelled than what is previously known. There are also requirements related to cost-effective and space-saving hardware arrangements to be used within the field of sensor technology for vehicles.

SUMMARY

Consequently, an object of the invention is to provide an improved method and arrangement which solves the above-mentioned problems associated with previously known solutions and which offers improvements in the field of determining the condition of a particular road surface. In particular, there is a requirement to be able to detect black ice on a road surface.

The above-mentioned object is achieved by a method determining a classification of a condition of a road surface for vehicle traffic, said method comprising: defining a reference surface of said road surface ahead of the vehicle; illuminating said reference surface with at least one light source positioned on the vehicle; detecting light which is reflected off said reference surface; and determining said classification of the condition of the road surface by analyzing detected information related to said reference surface. Furthermore, the method comprises the following steps: illuminating said reference surface by means of laser or LED light; providing image information related to said reference surface by detecting said reflected light by means of a Lidar unit; providing further image information related to said reference surface by scanning said reference surface by means of an RGB sensor; and determining said classification of the road surface by combining image information related to said reference surface from said Lidar unit and said RGB sensor.

By means of the invention, certain advantages are obtained. Firstly, it should be noted that the fact that image information from the Lidar unit and the RGB sensor, respectively, leads to improved detection having higher accuracy and improved resolution, as compared with previously known systems. This means that the detection of the road condition in question has higher reliability than known method.

A particular advantage of the invention is that the Lidar unit, in combination with the RGB sensor as mentioned above, allows measurements on a road surface which is located at a very long distance ahead of the vehicle in question. More precisely, the invention allows measurements up to approximately 250 meters ahead of the vehicle which is equipped with the Lidar unit. This leads to more accurate measurements and a more reliable and fast method for determining the classification of the road surface.

Also, the detection has improved contrast through the use of an RGB sensor in combination with a Lidar unit. This leads to an increased accuracy and consequently to improvements as regards road safety.

Furthermore, the above-mentioned method provides an advantage through the fact that it may be implemented in existing hardware systems in many of today's vehicles. In fact, it is common today that vehicles are equipped with a sensor arrangement comprising a Lidar unit and an RGB sensor, which can be configured for identifying obstacles and other objects in the vicinity of the vehicle by using measurement data from the Lidar unit and the RGB sensor. Such arrangements are required for example within the technology related to autonomous driving.

The fact that the method as mentioned above can be implemented in existing hardware in a vehicle is advantageous as regards the cost and and requirements for space for such hardware.

Also, the measurements will be more accurate and reliable than previously known methods since generally the entire road surface ahead of the vehicle can be used for measurements, i.e. instead of a relatively small and limited reference surface.

According to an embodiment, the method comprises: defining a first image of said road surface by means of the information provided by said Lidar unit; defining a second image of said road surface by means of the information provided by said RGB sensor; and defining a combined image from the first and second images.

According to a further embodiment, the method comprises a step of providing said first image by means of detected information regarding radiation reflected off the road surface within a predetermined wavelength interval.

According to an embodiment, the method comprises a step of providing said second image by means of detected information regarding edges, colours and contours and similar visual properties relating to the road surface.

According to a further embodiment, the method comprises a step of modelling laser light, alternatively LED light, from said light source in the form of either one or more light points or one or more lines.

According to an embodiment, the method further comprises a step of determining a road surface condition selected from at least one of the following: a dry and non-covered road surface; a road surface which is covered with water; a road surface which is covered with snow; and a road surface which is covered with ice.

According to a further embodiment, the method comprises a step of identifying, by means of said image data, one or more of the following road area sections: a left side lane; a right side lane; a left wheel track; a right wheel track; and a middle road section.

According to an embodiment, the method comprises a step of determining said road condition by using measurements of further operational conditions related to said vehicle.

According to an embodiment, the method comprises combining information, obtained within said reference surface ahead of said vehicle and related to colour or similar optical properties detected by said RGB sensor with light intensity information detected by said Lidar unit, in order to provide said classification of the road surface.

According to an embodiment, the method may comprise determining which of the following conditions applies to the road surface: a dry and non-covered road surface; a road surface which is covered with water; a road surface which is covered with snow; and a road surface which is covered with ice.

According to an embodiment, the method may comprise identifying, by means of said image data, a plurality of different road area sections forming said road surface, and determining which of the following conditions applies to each one of the road area sections: a dry and non-covered road surface; a road surface which is covered with water; a road surface which is covered with snow; and a road surface which is covered with ice.

According to an embodiment, the method may comprise determining said classification of the road surface by combining image information related to said reference surface in the form of light intensity values from said Lidar unit and light intensity values, corresponding to a number of colours or colour ranges, from said RGB sensor.

According to an embodiment, the method may comprise using colour data in three channels in the form of different wavelength intervals generated by said RGB sensor, in said step of determining said classification of the road surface.

According to an embodiment, the method may comprise using additional colour data in a fourth channel corresponding to 980 nm.

The method according to the disclosure is particularly useful within the field of autonomous vehicles, i.e. vehicles being equipped with sensors and control systems and being configured for navigating such vehicles along a route in an autonomous manner. The method may be used for providing accurate information regarding the road friction in different road areas, which is crucial in particular for autonomous vehicles since the steering and braking function of such a vehicle is dependent on the tire to road friction in all parts of a road surface which is travelled. However, it should be noted that the method according to the disclosure is not limited to vehicles which are configured for autonomous driving.

The above-mentioned object is also achieved by means of an arrangement for determining a classification of a condition of a road surface for vehicle traffic and within a reference surface of said road surface ahead of the vehicle, said arrangement comprising at least one light source positioned on said vehicle and being configured for illuminating said reference surface; a sensor for detecting light which is reflected off said reference surface; said arrangement being configured for determining said classification of the condition of the road surface by analyzing detected information related to said reference surface. Furthermore, the arrangement comprises a light unit for illuminating said reference surface, a Lidar unit for providing image information related to said reference surface by detecting said reflected light, an RGB sensor for providing further image information related to said reference surface by scanning said reference surface by means of an RGB sensor; and a control unit for determining said classification of the road surface by combining image information related to said reference surface from said Lidar unit and said RGB sensor.

The invention can be applied in different types of vehicles, such as cars, trucks, and buses.

Further advantages and advantageous features of the invention are disclosed in the following description and in the dependent claims.

BRIEF DESCRIPTION OF THE DRAWINGS

Further objects, features, and advantages of the present disclosure will appear from the following detailed description, wherein certain aspects of the disclosure will be described in more detail with reference to the accompanying drawings, in which.

DETAILED DESCRIPTION

Different embodiments of the present invention will now be described with reference to the accompanying drawings. The arrangements described below and defined in the appended claims can be realized in different forms and should not be construed as being limited to the embodiments described below.

Figure 1:
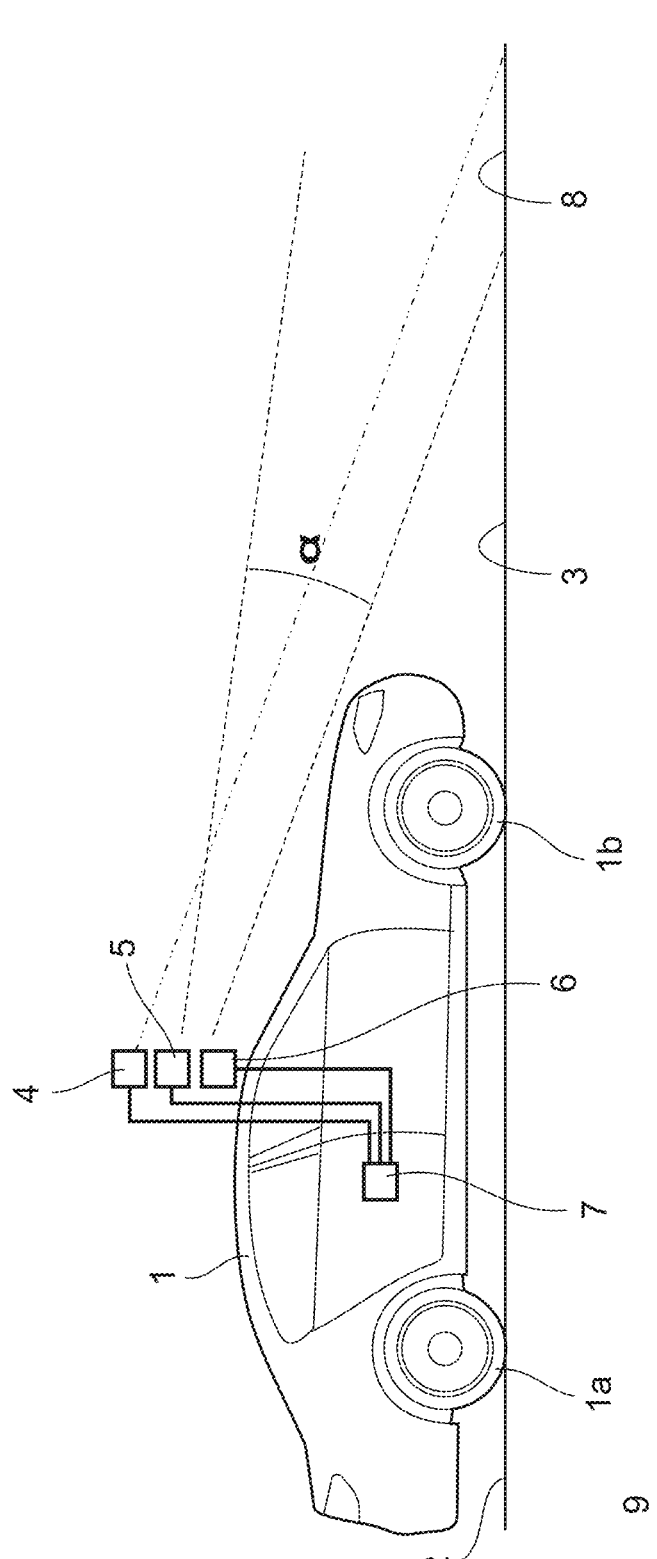
FIG. 1 shows a simplified side view of a vehicle being driven on a road surface and being arranged in accordance with the present disclosure.
Figure 1:

With initial reference to FIG. 1, there is shown a simplified side view of a vehicle 1 such as a conventional car which has four wheels (of which two wheels 1a, 1b are visible in FIG. 1) and is being driven along a road 2 having a road surface 3, i.e. a top surface of the road 2 having a certain structure and causing a certain friction relative to the wheels 1a, 1b. According to different examples, the road surface 3 can be in the form of asphalt, concrete, gravel, sand, dirt, grass or generally any form of surface which can be used for vehicle traffic.

In the embodiments below, it is assumed that the road surface 3 is constituted by asphalt.

This disclosure is based on a requirement to determine a classification of a condition of the road surface 3. In particular, there is a need to determine which condition or conditions are present across the entire width of the road 2. As discussed initially, and as described in FIG. 2 which is a view of the road surface 3 as seen from a driver's seat in the vehicle 1, the road surface 3 may be regarded along its width and comprises two side lanes 3a, 3b, two wheel tracks 3c, 3d and a centre section 3e, i.e. a strip in the middle of the road surface 3. Depending on the weather, and in particular depending on whether there is a winter climate, the side lanes 3a, 3b and the centre section 3e may be covered for example with snow, whereas the wheel tracks 3c, 3d may be dry. This is indicated in a simplified form in FIG. 2. This also means that the driver may drive the vehicle 1 relatively safely on the dry wheel tracks 3c, 3d since there is a relatively high friction between the vehicle wheels 1a, 1b and the wheel tracks 3c, 3d. On the other hand, if the vehicle 1 should be driven on the side lanes 3a, 3b or the centre section 3e, there is a much higher risk for slippery road conditions since these sections 3a, 3b, 3e are covered with snow.

Figure 2:
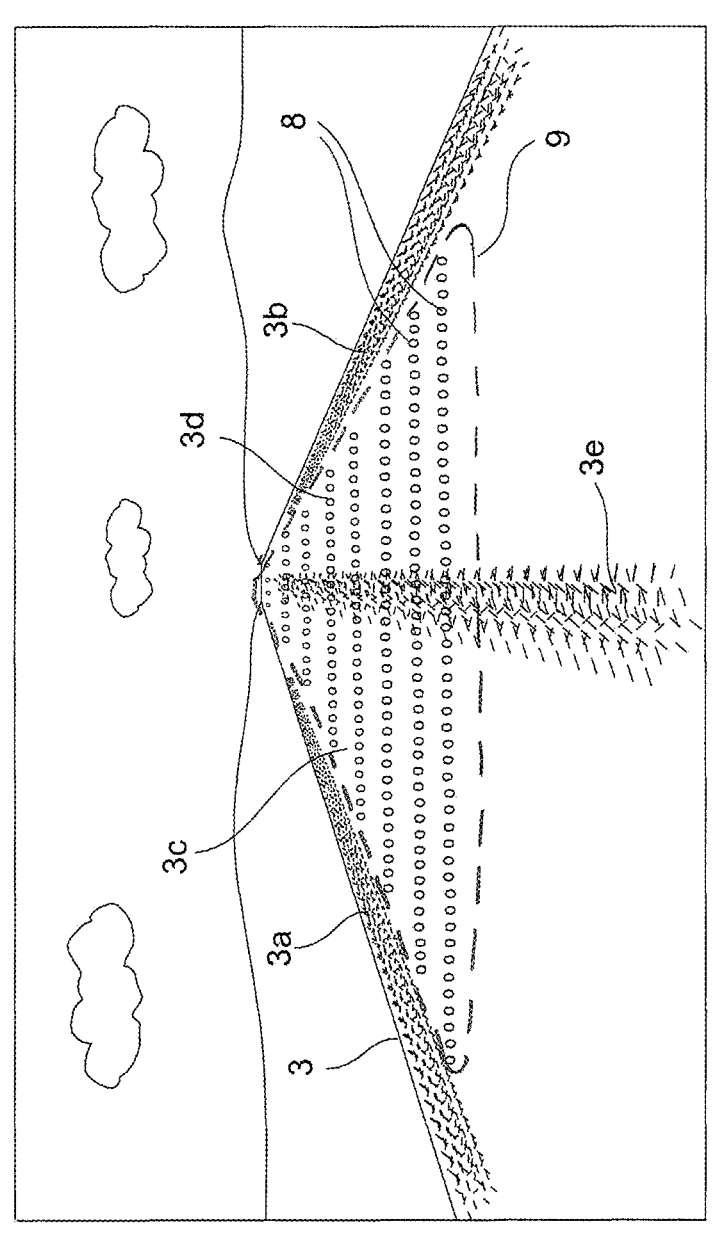
FIG. 2 shows a view of a road surface as regarded from a driver's point view, i.e. from which the road surface is observed.

The purpose of FIG. 2 is to indicate in a simplified manner an example in which the wheel tracks 3c, 3d are dry and not covered with any ice, snow or water, whereas the side lanes 3a, 3b are covered with snow.

In order to determine the road condition for the entire road surface 3, i.e. for all the road sections 3a-3e, the vehicle 1 is equipped with an arrangement comprising a light source 4, suitably in the form of a laser light source or an LED light source, a Lidar ("light detection and ranging") unit 5 and an RGB camera 6, as shown in the embodiment of FIG. 1.

The purpose of the light source 4 is to generate light (i.e. laser light, alternatively LED light) which is used to illuminate the road surface 3. According to an embodiment, the light source 4 should be configured for a wavelength which is within an interval of approximately 900-2000 nm, and preferably a reference wavelength which is approximately 980 nm. In particular, it should be noted that light from the light source 4 at the wavelength 980 nm is not influenced by light absorption in water, snow or ice in the same manner as the light from the Lidar unit 5 (which is preferably of the wavelength 1550 nm). For this reason, the light from the light source 4 will be used as a reference. According to further embodiments, the wavelength can extend to lower values, towards approximately 400 nm, in order to provide illumination also in a visible wavelength range.

According to an embodiment shown in FIG. 1, the light source 4 is positioned at a relatively high position on the vehicle 1, such as for example in the area of the vehicle's 1 windshield. According to a further embodiment, the light source 4 can be positioned at the front section of the vehicle 1, in particular at a position which is within or adjacent to an existing vehicle light unit comprising conventional headlamps.

Furthermore, the Lidar unit 5 is based on technology which is known as such and which is configured for detecting an object (and measuring the distance to the object) by first illuminating the object with laser light at a particular distance, and then measuring the time for detecting a reflection of the emitted light off the object which returns to the Lidar sensor. Lidar technology can be used to produce three-dimensional images of objects, and is suitable for example in the field of object recognition, obstacle detection and navigation systems in vehicles, both autonomous vehicles and regular, non-autonomous vehicles.

The Lidar unit 5 is based on certain components, such as a laser emitter, a photodetector and control electronics. The laser emitter is configured for scanning a particular area, target or environment, and the photodetector is configured for detecting laser light which is reflected off any object being scanned by laser light and which is returned to the photodetector. In this manner, an image of the object can be produced in the Lidar unit 5. The basic technology behind a Lidar unit is previously known as such, and for this reason it is not described in greater detail here.

According to an embodiment, the Lidar unit 5 is configured with a laser light source having a wavelength of 1550 nm, which is a wavelength which is eye-safe at relatively high power levels which are suitable for the embodiments according to this disclosure. However, the concept according to the disclosure is not limited to this particular wavelength only.

Generally, and according to further embodiments, the Lidar unit 5 may be configured with a laser light source which has a wavelength which is 1450 nm or more.

Furthermore, the RGB camera 6 comprises an image sensor of generally conventional type, i.e. which is arranged for sensing and capturing image information. One suitable type of image sensor is the so-called CMOS sensor. The image information is provided in accordance with the so-called RGB colour model based the principle that red, green and blue light is combined in order to produce a large number of colours. The technology related to today's RGB sensors is well-known, and for this reason it is not described in further detail here.

In the following, it is assumed that the system comprises a separate light source 4, either in the form of a laser or LED light source. The light source 4 is suitably used in order to improve measurements when the vehicle is used during nighttime. However, according to a further embodiment (not shown in the drawings), this light source can be omitted.

With reference to FIG. 1, it can be noted that the laser light unit 4, the Lidar unit 5 and the RGB camera 6 are connected to a control unit 7, which is configured to control the operation of the laser light unit 4, the Lidar unit 5 and the RGB sensor 6 as will be described below. The control unit 7 is also configured to receive image information from the Lidar unit 5 and the RGB camera 6 and for treating said information in order to generate information regarding the condition of the road surface 3.

The Lidar unit 5 has a laser emitter device which is configured for generating a beam of modulated laser light towards the road surface 3 during operation of the vehicle 1. More precisely, the laser light is arranged so as to strike the road surface 3 at a confined area, i.e. a reference area 9, as shown in FIG. 2. According to the embodiment shown in FIG. 2, the reference area 9 covers generally the entire road surface ahead of the vehicle 1. Also, as shown, the laser light is arranged in the form of a number of measurement spots 8 which are emitted generally along a plurality of lines which extend in a direction which is transversal to the direction of travel of the vehicle, as shown in FIG. 2. In this manner, the laser light can be used for covering generally the entire road surface area within a distance of up to 250 meters ahead of the vehicle 1, in order to illuminate the road surface 3.

The disclosure is not limited to an embodiment in which one single laser light unit in a Lidar unit is used for illuminating the road surface 3. According to further embodiments, two or three such laser light units can be used.

The laser light which strikes the road surface 3 will be reflected off the road surface 3 and will be scattered in different directions. A certain amount of the reflected light will be detected by the Lidar unit 5. The scattering of light from the road surface 3 and the absorption of light by the road surface 3 varies depending on the wavelength of the light and on the condition of the road surface 3a. This means that the road condition can be determined by measuring the light intensity as a function of the wavelength.

The Lidar unit 5 is arranged to capture point data within a wavelength interval which is adapted to the emitted light from the laser light unit in the Lidar unit 5, i.e. the data is the intensity of the reflected light from the illumination source.

According to different embodiments, the wavelength can be chosen to be 980 nm, 1550 nm or 1940 nm. According to particular embodiments, the wavelengths can is be chosen within the visible range, i.e. from approximately 400 nm and within the visible range of wavelength.

The positioning of the Lidar unit 5, and consequently also its laser light source, is suitably chosen so that it is situated relatively high up on the vehicle 1. In this manner, it will be arranged so that the light strikes the road surface 3 ahead of the vehicle 1 and relatively close to the vehicle 1 or far away from the vehicle 1, and so that the intensity of the reflected light is sufficient for detecting by means of the Lidar unit 5. The Lidar unit 5 can be configured so that the laser light strikes the road surface 3 within a large range, from approximately 2-5 meters ahead of the vehicle 1 and up to approximately 200-250 meters ahead of the vehicle 1, depending for example on the power of the laser light unit in the Lidar unit 5.

Reflected laser light is measured using the Lidar unit 5. Based on the detected signal, it can for example be determined whether the road surface is covered with snow, ice or water.

According to an embodiment, the Lidar unit 5 is used for determining whether the road surface 3, i.e. each one of the road surface sections 3a-3e, has one of a number of possible road surface conditions. For example:

i) the road surface 3 may be dry and non-covered, i.e. which corresponds to a relatively warm and dry weather without any snow, ice or water which covers the road surface 3; or ii) the road surface 3 may be covered with water, i.e. which can be the case just after a rainfall; or iii) the road surface 3 may be covered with snow, which can be the case after a snowfall; or iv) the road surface 3 may be covered with ice, i.e. in case that snow or water covering the road surface 3 has transformed to ice.

According to an aspect of the invention, a method is provided which is configured for determining which particular road condition of the above-mentioned alternative road conditions exists at a given point in time on the road surface 3. According to an aspect, the invention is configured for identifying which one of the above-mentioned road conditions exists in each one of a number of road area sections. According to an aspect, these road area sections are constituted by a left side lane 3*a*, a right side lane 3*b*, a left wheel track 3*c*, a right wheel track 3*c* and a middle road section 3*e*. Other configurations of road area sections may occur within the principles of the invention.

In addition to the above-mentioned four main types of road surface 3 coverings, the road surface 3 can be covered by combinations or mixtures of different types, for example a mixture of snow and water, i.e. sleet or slush, or a mixture of ice and water, i.e. a road surface covered with ice which in turn is covered with a layer of water. Furthermore, a particular type of covering is so-called black ice, i.e. clear ice which is generally transparent so that the road surface 3 can be seen through it.

In case of snow covering the road surface 3, the snow can be for example in the form of bright white snow, which corresponds to a case where snow has just fallen, or it can be grey or dark, which corresponds to a case where the snow has been covering the road surface 3 for a relatively long period of time so that it is dirty from pollution and other substances. Both these conditions are relevant when determining the friction of the road surface 3 and for determining for example whether the road surface condition requires caution for drivers travelling along such roads.

Furthermore, according to an embodiment, the vehicle 1 is equipped with the above-mentioned RGB sensor 6 for capturing digital images and storing image data related to said images for later analysis and image processing. The RGB sensor 6 is arranged in the vehicle 1 so as to generate said image data within the above-mentioned reference surface 9 which is located ahead of the vehicle 1. The direction of scanning of the RGB sensor 6 defines a predetermined angle α with respect to a horizontal plane along which the road 2 is oriented.

The RGB sensor 6 is used to define a scanning window which corresponds to a digital image which is formed by an array of a large number of image pixels. The scanning window is configured so as to cover the road surface 3 ahead of the vehicle 1, as described in FIG. 2. The image pixels are arranged along a number of rows and columns which together form the scanning window. An image which is captured by the RGB sensor 6 is stored in a manner in which image data is registered for all the pixels of the image. According to an embodiment, the pixels of the image contains image data defined according to the so-called RGB colour system. This system can be used to define virtually all possible colours from a combination of red, green and blue colour components. In other words, each colour in the RGB colour system can be described by means of image data representing how much of the red, green and blue colour components which forms part of the colour in question. The red, green and blue components are defined as a number being defined, for example, by 8 bits each, thereby having number values extending from 0 to 255. For example, the colour black corresponds to a red value of 0, a green value of 0 and a blue value of 0, whereas the colour white corresponds to a red value of 255, a green value of 255 and a blue value of 255. A high number of further colours can be defined by all combinations of the red, green and blue values, each of which can extend between 0 and 255.

According to an embodiment, the RGB sensor 6 and the control unit 7 are configured for detecting the RGB colour code for each image pixel in its scanning window. This corresponds to the optical properties of the image in question. In this manner, the control unit 7 may differentiate between different areas of the road surface 3 by comparing RGB color codes for the pixels corresponding to the entire scanning window.

In particular, the RGB sensor 6 is arranged for scanning the entire transversal width of the road 2. Also, the image data generated by the RGB sensor 6 is combined with the image data generated by the Lidar unit 5 so as to determine a classification of the condition of the entire road surface 3. This will be described in greater detail below.

As mentioned, the Lidar unit 5 and the RGB sensor 6 are connected to the control unit 7 which is arranged for analyzing incoming sensor data so as to determine which road condition applies in each road section 3*a*-3*e*. In particular, the control unit 7 comprises stored software for digital image treatment which is used for treatment of the image data from the RGB sensor 6. Accordingly, the RGB sensor 6 is configured for detecting certain characteristics on the road surface 3 and for identifying elements in a particular scene. For example, transitions between different road sections such as for example an asphalt road area and an adjacent roadside with another surface covering, for example grass, can be detected. Also, the RGB sensor 6 can for example be used for distinguishing between side lanes covered with snow and dry wheel tracks. The RGB sensor 6 can also be used for recognizing other visual variations—such as edges and boundaries—in the scene which is represented by the road surface 3. Furthermore, the control unit 7 can be provided with software for example for filtering and enhancing image data from the RGB sensor 6 in order to contribute to an accurate image of the road surface 3. Also, the RGB sensor 6 can be used for detecting other obstacles in the vicinity of the road surface 3, such as for example other vehicles, bicycles and pedestrians.

Generally, the image treatment software used in the control unit 7 can be used for identifying different road area sections by recognizing optical properties related to brightness or colour, or positions of edges and borders, or pattern recognition, extraction of image features or other image treatment in the different road areas. In this manner, the different road area sections 3*a-e* can be separated and identified based on their optical properties, as detected through the image data contained in the images as captured by the RGB camera unit 6.

Through the use of image data from the RGB sensor 6 and digital image treatment in the control unit 7, a precise image of the road surface 3 can be defined (as will be further described below with reference to FIG. 4). For example, the boundaries and positions of the side lanes 3*a*, 3*b*, the wheel tracks 3*c*, 3*d* and the centre section 3*e* as shown in FIG. 2 can be identified. For example, an area which is analyzed as having a bright white colour can be expected to be covered with snow. Furthermore, an area which is analyzed as being relatively dark can be expected to a dry, non-covered area. Consequently, different areas having different optical properties can be detected and identified as different sections of the road 2 having particular road surface coverings and different road surface conditions.

Figure 3:
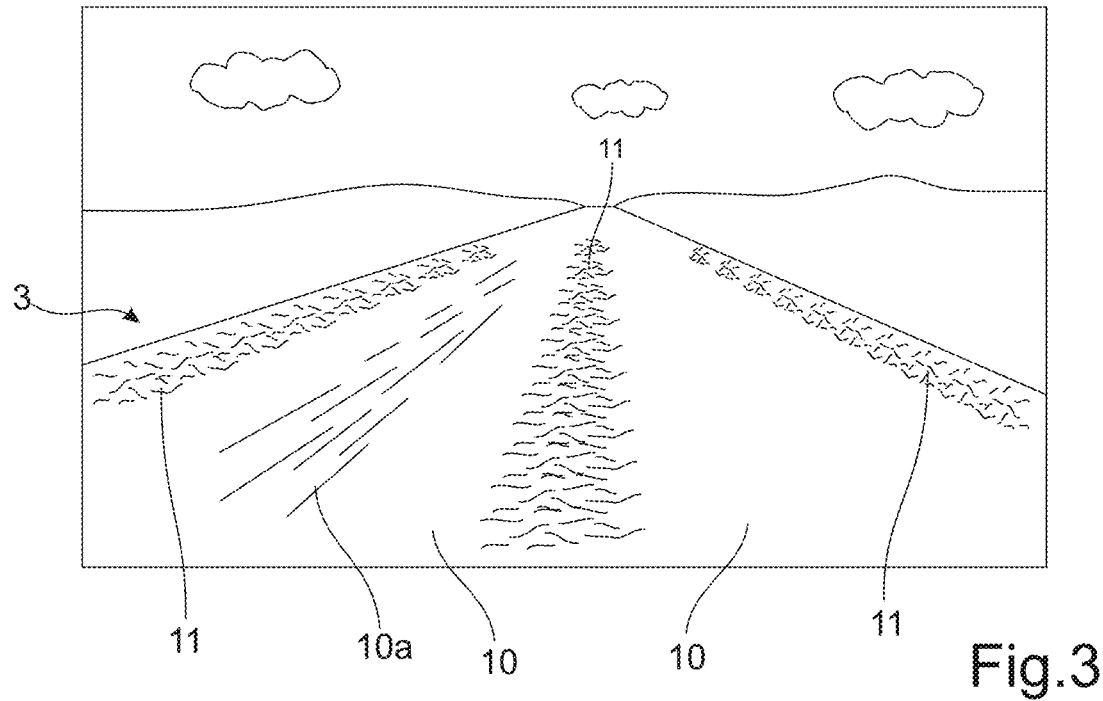
FIG. 3 is a view of a first image as provided in accordance with the disclosure.

FIG. 3 is a simplified view of an image produced by the Lidar unit 5. According to an embodiment, the image consist generally of two different types of areas, i.e. a first type of area 10 which corresponds to dry asphalt (i.e. having a particular spectral response as a result of detection of reflected light by the Lidar unit 5) and a second type of area 11 which corresponds to snow (i.e. having a further type of spectral response). The image in FIG. 3 is merely an example, and many other types of images can obviously occur depending on weather and other factors. As a further example of a road condition, an area of black ice 10a is also shown in FIG. 3. The term "black ice" is used to describe clear ice which is generally transparent so that the road surface 3 can be seen through it. As shown in FIG. 3, an area of black ice 10a is formed along the road and along the first area 10.

The image data which is captured by the Lidar unit 5 corresponds to the detected light intensity resulting from reflections of the laser light from the laser light unit 4, as reflected in the road surface 3. The reflected laser light corresponds as such to a spectral response which in turn depends on the material of the road 3 and any material located on top of the road surface 3, such as ice, water or snow. This means that the Lidar unit 5 can be used to detect and distinguish between different areas or sections of the road surface 3 having different road conditions. However, the boundaries between the different areas 10, 11 are not entirely sharp but can rather be described as continuous transitions, which makes it difficult to provide an accurate image of the entire road surface 3.

Figure 4:
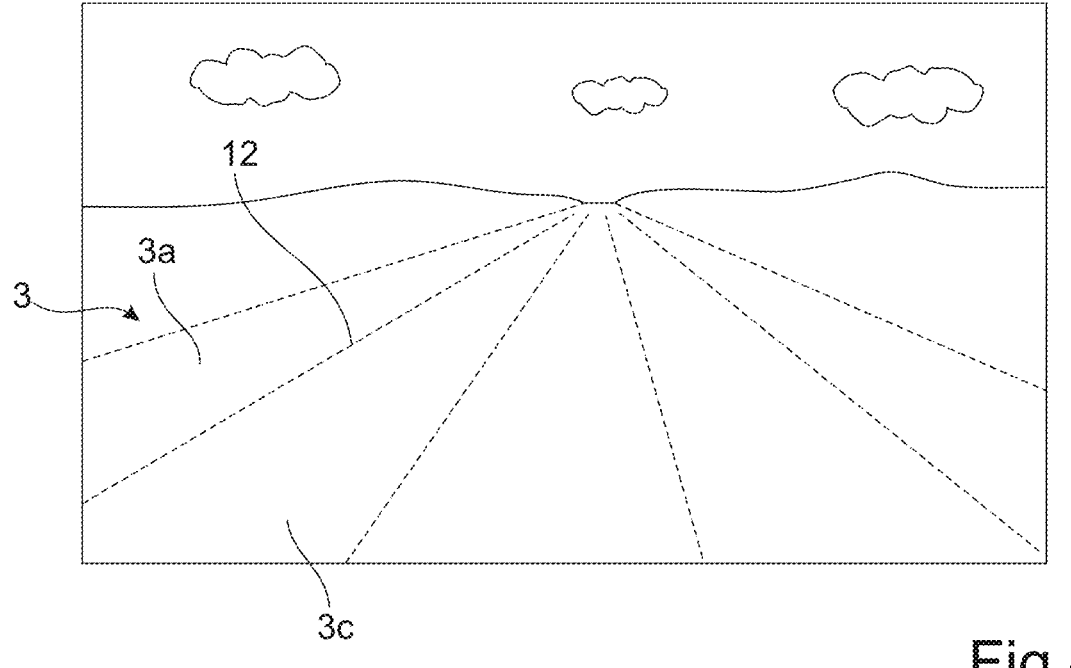
FIG. 4 is a view of a second image as provided in accordance with the disclosure.

FIG. 4 is a simplified view of an image produced by the RGB sensor 6. As mentioned above, the RGB sensor 6 can be used for example for recognizing visual properties and variations along the road surface 3. As shown in FIG. 4, a transition or boundary 12 between a first side lane 3a and an adjacent wheel track 3c, for example, can be detected in a precise manner. Similar boundaries can be defined as regards different sections of the entire road surface 3.

The RGB sensor 6 is configured for providing measurement data in four channels, more precisely in four different wavelength ranges corresponding to red, green and blue and also a NIR (near infrared) range. The measurement data is in particular constituted by values of the measured light intensity. The measurement data is provided in the form of images with spectral information in each of said wavelength ranges. To this end, a CMOS-based sensor is preferably used. Also, it is preferable that the RGB sensor 6 is of the type which is configured for so-called "hyperspectral imaging". In particular, a wavelength of 980 nm is advantageous to use, primarily since it will not be visible to the human eye and consequently will not disturb other drivers or pedestrians.

The image from the Lidar unit 5 and the spectral images from the RGB sensor 6 are combined or superposed by means of the control unit 7. This means that the combined information from the combined images can be used for example to add information from the RGB sensor 6 image regarding edges and boundaries to the Lidar unit 5 image. This combining of image data from the Lidar unit 5 and the RGB sensor 6 are suitably arranged as layers which are arranged on top of each other and which are aligned with each other as regards the position of the road surface 3 and its various sections and transitions. In this manner, corresponding objects in the image data from the Lidar unit 5 and the RGB sensor 6 can be aligned. For example, data representing for example a left wheel track 3c from the Lidar unit 5 can then be aligned with data representing the same left wheel track 3c from the RGB sensor 6. Such layered information can be displayed clearly on a computer screen so that the information from both the Lidar unit 5 and the RGB sensor 6 is clearly visible at the same time and in an aligned manner. In this manner, higher accuracy, improved resolution and improved contrast as compared with previously known systems can be obtained. This leads to an increased accuracy and consequently to improvements as regards road safety.

In summary, the system and method shown in FIGS. 1-4 is used for detecting light radiation which is reflected off the reference surface 9 as a result of incoming laser light. A classification of the condition of the road surface 3 can then be obtained by analyzing detected information related to said reference surface 9. More precisely, image information related to the reference surface 9 can be obtained by detecting said reflected light by means of the Lidar unit 5 and further image information related to said reference surface 9 can be obtained by scanning the reference surface 9 by means of the RGB sensor 6. Finally, a classification of the road surface 3 is obtained by combining image information related to the reference surface 9 from the Lidar unit 5 and the RGB sensor 6 as described above.

An important invention with the present invention is that it uses a reference area 9 which covers a high number of laser lines, for example 256 laser lines, each of which consists of 256 measuring spots. The specific number of laser lines and measuring spots may obviously vary depending on which type of Lidar unit is used. This allows measurements along a relatively large part of a road surface, and at a relatively long distance from the vehicle 1. Consequently, early information regarding the road surface condition ahead of the vehicle 1 can be provided.

According to an aspect of the invention, different wavelengths are used for road condition classification. When using light with different wavelengths for road condition classification, one of the main physical properties that is exploited is light scattering which is dependent on the surface roughness. For example, for a smooth surface there will be a specular reflection and for a rough surface there will be a diffuse reflection, changing the reflection intensities for a detector such as a photodetector, lidar or camera. This can be used for classifying wet and dry asphalt.

Figure 5:
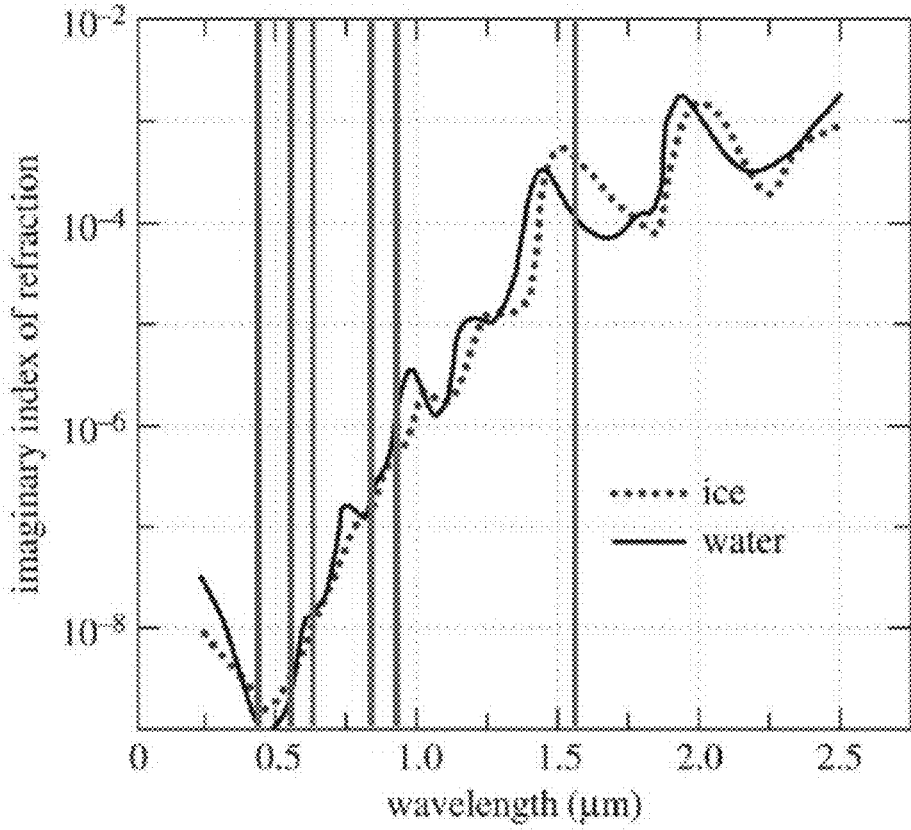
FIG. 5 shows a curve which represents the index of refraction of ice and water, in relation to the wavelength.

In order to enable classification of several road conditions such as dry asphalt or asphalt covered with either water, ice or snow, or any combination of these different conditions, the light absorption is the main physical property that is exploited. FIG. 5 shows the imaginary index of the refractive index for water and ice that is coupled to the absorption. In FIG. 5 it is seen that for different wavelengths there is different absorption for water and ice. By combining different wavelengths it is possible to create parameters that enable classification of different road conditions. According to an aspect, the classification can be implemented by combining image information related to said reference surface 9 in the form of light intensity values from said Lidar unit 5 and light intensity values from said RGB sensor 6 with the representation of a number of colours or colour ranges.

In an RBG camera, the wavelength for Red (0.67 μm), Blue (0.47 μm) and Green (0.55 μm) are combined to an image but by separating each part and combining them with a Lidar wavelength (suitably around 0.8-0.9 μm or 1.55 μm) it is possible to calculate parameters that enable classification of different road conditions, and especially road conditions that are slippery. See the markings of the different wavelengths in the form of corresponding vertical lines in FIG. 5.

According to an embodiment, a process of separating each part from the RGB sensor 6 and combining them with the Lidar wavelength may comprise the following steps:

i) the light intensity for three selected frequencies or frequency intervals are detected by the RGB sensor 6;

ii) the light intensity for one of the Lidar wavelengths (either 0.8-0.9 μm or 1.55 μm) is detected;

iii) quotients are calculated by combining the measured light intensity of each one of the selected RGB sensor 6 frequencies with the measured light intensity from the Lidar unit 5; and iv) determining, from such a calculation step, a number of different quotients by means of which different road conditions can be determined (for example by defining limits for each one of the quotients which correspond to certain road conditions or other signal processing methods).

Figure 6:
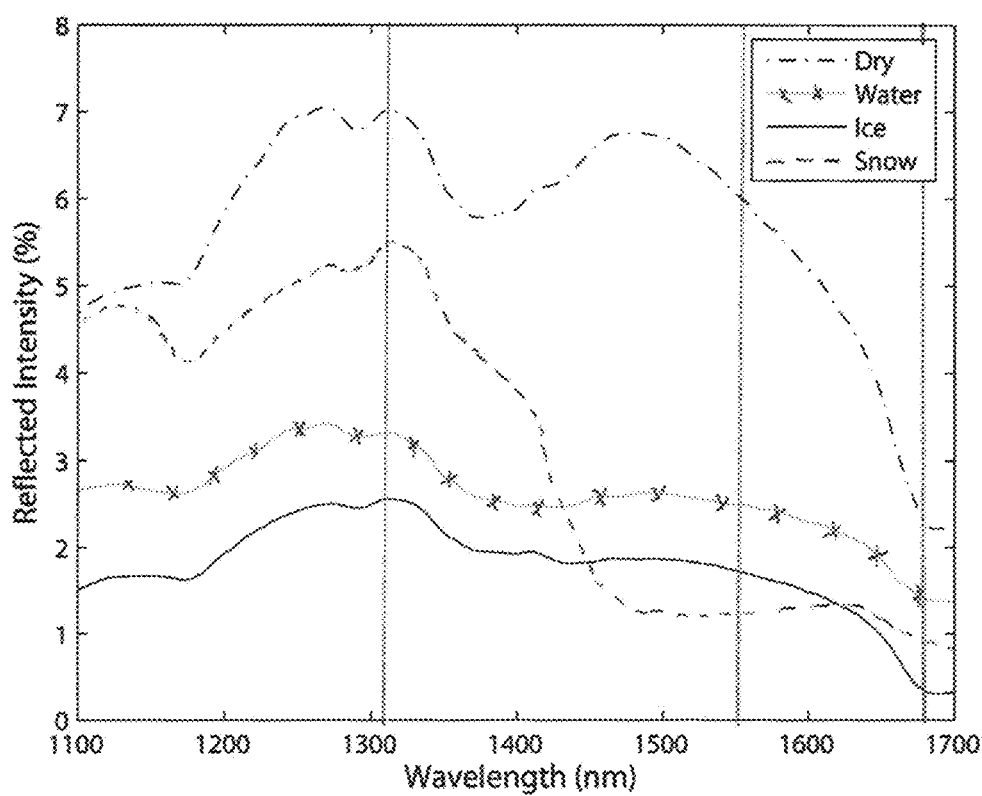
FIG. 6 shows a curve which represents the reflected light intensity, depending on the wavelength, of a number of road conditions.

FIG. 6 shows a light absorption spectrum for dry asphalt and asphalt covered with water, ice and snow for the wavelengths 1100 nm (1.1 μm) to 1700 nm (1.7 μm). In this case to separate the four road conditions from each other the optimal wavelengths are 1310, 1550 and 1690 nm.

Figure 7:
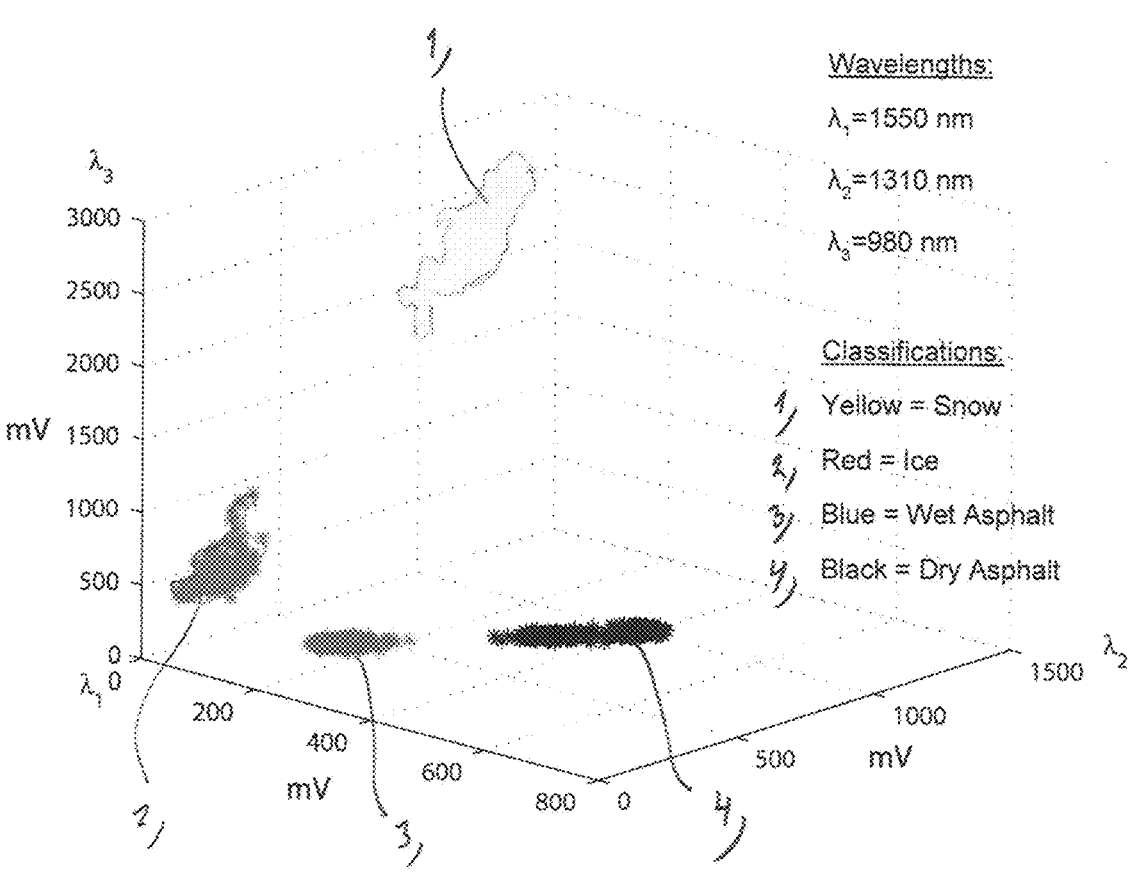
FIG. 7 shows measurement clusters representing a number of road conditions.

As another example, if 1690 nm is not available, 980 nm can be used as well giving the results shown in FIG. 7 which shows how clusters from the four different road conditions can be separated from each other using a combination of the reflections from several wavelengths.

Quotients which correspond to the different angles in the 3D space are different for each one of the road conditions. This allows a classification so as to distinguish between said road conditions. A further parameter which can be used in the distance from each cluster to the origin. It if however preferable to use the quotients in order to determine the road conditions. The term "mV" which is indicated in FIG. 7 corresponds to the measured intensity reflection of the RGB sensor for each one of the three wavelengths.

The values representing the wavelengths shown in FIG. 7 should be regarded as examples. Other values may occur.

Figure 8:
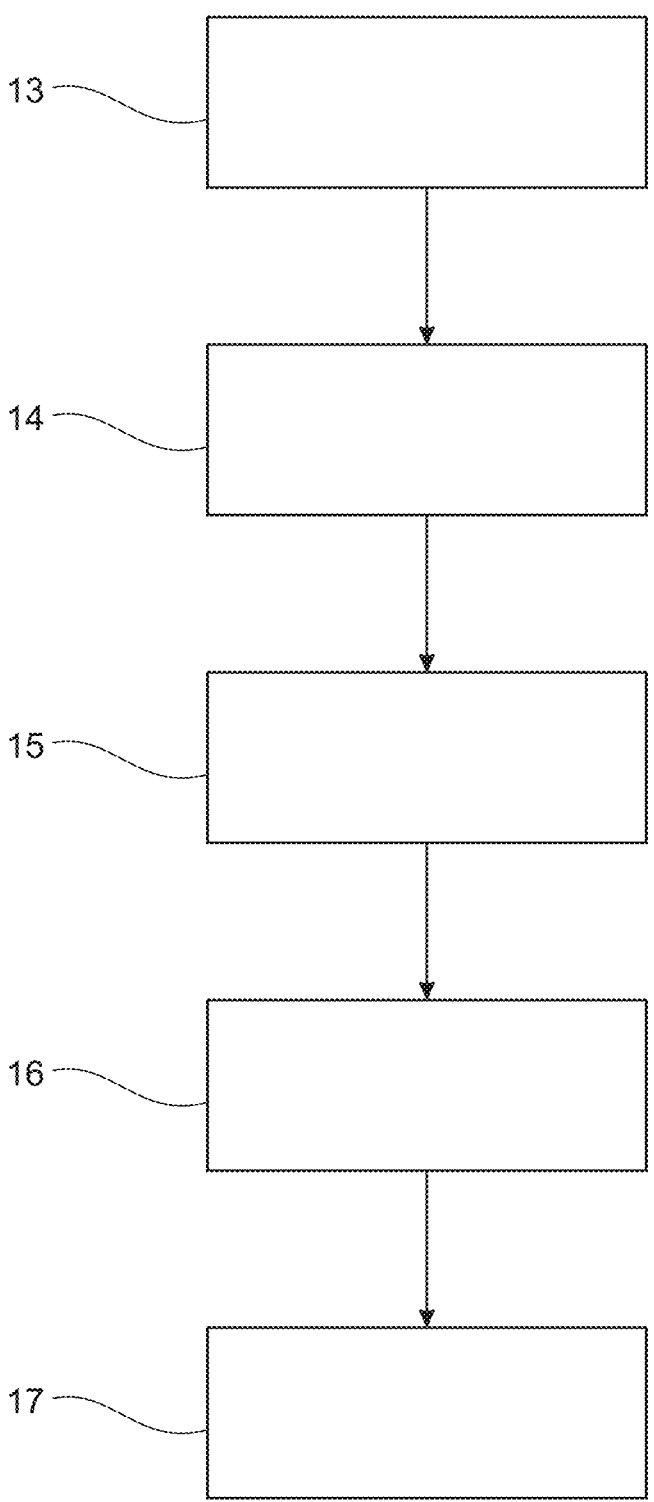
FIG. 8 is a simplified flow chart describing the method according to the disclosure.

FIG. 8 is a simplified flow chart showing the operation of an embodiment of the invention. Initially, the laser light unit 4 is actuated (step 13 in FIG. 5) for generating light directed towards the reference surface 9. Next, the Lidar unit 5 is actuated (step 14 in FIG. 5) so as to define a first image comprising information regarding the road surface condition. Next, the RGB sensor 6 is actuated (step 15) so as to define a further image comprising information regarding the road surface condition. Next, the images are combined by combining image information from the images as described above, and then treated in the control unit 7 (step 16) in order to provide a classification of the surface condition of the entire road surface 3 in question. Based on the optical properties in the road areas, assumptions are made in the control unit 7 so as to determine the road surface condition of the relevant road areas. Finally, information related to the road surface conditions is suitably also presented to the driver of the vehicle (step 17). For this reason, the control unit 9 may include means for informing the driver of the road condition, for example a display arranged in the vehicle's dashboard (not shown in the drawings).

According to an embodiment, the RGB sensor 6 generates—for each detected pixel—colour data in three channels in the form of different wavelength intervals, and if needed, the addition of a further channel corresponding to 980 nm. Referring to embodiments above, the wavelength may in some cases extend down to approximately 400 nm, i.e. within the range of visible light. Furthermore, the Lidar unit 5 will measure the intensity in the reflected light from the road surface. Different intensity values will be provided depending on the condition of the road surface, i.e. depending on whether there is for example ice, snow or water on the road surface. The information from the RGB sensor 6 will then be combined with the information from the Lidar unit 5.

If, for example, the RGB sensor 6 should provide information stating that the detected colour in a given pixel is white (i.e. an RGB colour code corresponding to white), the information will then be combined with the information from the Lidar unit 5, i.e. intensity-based information which will determine whether the detected white colour corresponds for example to snow or ice (which both may appear to have the same white colour). In this situation, the Lidar unit 5 preferably uses the 1550 nm wavelength. The Lidar unit 5 will detect intensity-based values in which a relatively low intensity corresponds to snow, a medium intensity corresponds to ice and a higher intensity corresponds to water. An even higher intensity will correspond to a dry road surface.

The colour values detected by the RGB sensor 6 (in the form of light intensity values) could consequently be combined with the intensity values from the Lidar unit 5 in order to accurately determine the road condition in each detected pixel. Values related to detected light intensity being generated by the Lidar unit 5 can be used in several intensity ranges which are used in combination with a number of colours or colour ranges (represented by detected light intensity values) being detected by the RGB sensor 6.

According to a further embodiment, a light source such as a LED light having the wavelength of 980 nm is used for transmitting such light on the road surface 3. Such light is not visible to the human eye and will consequently not disturb or distract other vehicle drivers or pedestrians. Furthermore, when such 980 nm light is used for illuminating snow or ice, there will be stronger reflections and a more accurate detection of colour values by means of the RGB sensor 6. Consequently, a higher quality of the process for determining the road surface condition will be provided.

As another option, the control unit 9 may be configured for transmitting information regarding the road surface condition to external companies, for example road freight companies. Such information can be of assistance for example when planning which routes to travel.

According to a further embodiment, self learning algorithms can be used on both the lidar and the RGB data, and also the superimposed image-related data, in order to get an improved classification of the road surface. Also, other data such as air temperature from the vehicle and similar information could be used.

In addition, the classification of the road surface condition can be further improved using other means of measurements, data and parameters which relate to the operation and condition of the vehicle 1. For example, it can be determined whether the windshield wipers are actuated in the vehicle. In such case, it can be assumed that there is either snow or rain falling on the road surface 3. According to a further example, it can be detected whether an arrangement of anti-lock braking system (ABS) (not shown in the drawings) arranged in the vehicle 1 is actuated. In such case, it can be assumed that the friction between the wheels and the road surface is relatively low, which may be the result of ice or snow covering the road surface. Other units, such as a traction control system (TCS) or an electronic stability control (ESC) system, determining parameters relating to the operation of the vehicle, can be used in order to determine the road surface condition, i.e. to determine whether the road surface 3 is covered with ice, water, snow or whether it is dry. This information can also be used for providing information related to the friction of the road surface 3 and its sections.

The invention is not limited to the embodiments described above, but can be varied within the scope of the appended claims. For example, the invention is not limited to processing image data according to the RGB colour coding system. Another useful system is the so-called CMYK system, which is a subtractive colour system which uses four colours (cyan, magenta, yellow and black), which are normally used during colour printing. The CMYK system is based on a principle in which colours are partially or entirely masked on a white background.

Also, data related to the classification of the road surface condition can be associated with a time stamp and also with position data. In other words, information can be generated which indicates when and where the road surface condition was classified. This is particularly useful if said data is to be used in applications for example for generating maps with information relating to the road surface condition along certain roads on such maps. Such map-generating applications can for example be used in other vehicles, in order to present relevant road-related status information.

For example, other parameters than data from the Lidar unit 5 and the RGB sensor 6 can be used. Such an example is data related to the temperature of the road surface 3, which can be crucial when determining for example the friction of the different road area sections 3*a-e*. As an example, if the Lidar unit 5 indicates that the road surface condition (in the right wheel track 3*d*) corresponds to a "dry surface" and the RGB sensor 6 indicates that the middle road section 13 is darker than the right wheel track 12, it can be assumed that the middle road section 13 is covered with water. If a temperature sensor also indicates that the temperature is relatively low, possibly also that the temperature is rapidly decreasing over time, there may be a considerable risk for very slippery road conditions.

According to a further example, if the road condition sensor and the camera unit indicate that the wheel tracks are covered with water even though the temperature is below zero degrees Centigrade, it can be assumed that the wet road surface is the result of a use of road salt having been spread out on the road surface.

Furthermore, the RGB sensor 6 can be used for generating image data also relating to the sky (see FIG. 2). This means that certain information relating to the weather, formation of clouds etc., can be used. As an example, if the road condition sensor and camera unit indicate that the wheel tracks are dry, i.e. non-covered, while at the same time the image data related to the sky 18 indicates a relatively dark colour, it can be expected that clouds occur in the sky 18 and that rain may fall (or possibly snow, depending on the temperature) further ahead on the road 3.

Also, the image data mentioned above can be data generated both in the form of still pictures and a video signal.

Finally, the inventive concept is not limited to use in vehicles such as cars, trucks and buses, but can be used in fixed, i.e. non-movable, monitoring stations for carrying out measurements in the same manner as explained above.

The invention claimed is:

1. A method for determining a classification of a condition of a road surface for vehicle traffic, said method comprising:

defining a reference surface of said road surface ahead of the vehicle;

illuminating said reference surface with at least one light source positioned on the vehicle, the at least one light source being a laser or LED light;

detecting light which is reflected off said reference surface by a Lidar unit to provide image information related to the reference surface;

scanning said reference surface by an RGB sensor to provide additional image information related to said reference surface;

determining said classification of the condition of the road surface by combining the image information and the additional image information related to said reference surface from said Lidar unit and said RBG sensor;

defining a first image of the road surface by the image information provided by the Lidar unit;

defining a second image of said road surface by the additional image information provided by the RGB sensor; and defining a combined image from the first and second images.

2. The method according to claim 1, further comprising: providing said first image by detected information regarding radiation reflected off the road surface within a predetermined wavelength interval.

3. The method according to claim 2, further comprising: providing said second image by detected information regarding edges, colors and contours and similar visual properties relating to the road surface.

4. The method according to claim 1, further comprising: providing said second image by detected information regarding edges, colors and contours and similar visual properties relating to the road surface.

5. The method according to claim 1, further comprising: modelling the laser or LED light from said light source in the form of either one or more light points or one or more lines.

6. The method according to claim 1, further comprising: determining a road surface condition selected from at least one of the following:

a dry and non-covered road surface, a road surface which is covered with water, a road surface which is covered with snow, and a road surface which is covered with ice.

7. The method according to claim 1, further comprising: identifying, by said image data, one or more of the following road area sections:

a left side lane, a right side lane, a left wheel track, a right wheel track; and a middle road section.

8. The method according to claim 1, further comprising: determining said road condition by using measurements of additional operational conditions related to said vehicle.

9. The method according to claim 1, further comprising: combining information, obtained within said reference surface ahead of said vehicle and related to color or similar optical properties detected by said RGB sensor with light intensity information detected by said Lidar unit, in order to provide said classification of the road surface.

10. The method according to claim 1, further comprising: determining which of the following conditions applies to the road surface:

a dry and non-covered road surface, a road surface which is covered with water, a road surface which is covered with snow, and a road surface which is covered with ice.

11. The method according to claim 1, further comprising: identifying, by said image data, a plurality of different road area sections forming said road surface, and determining which of the following conditions applies to each one of the road area sections:

a dry and non-covered road surface, a road surface which is covered with water, a road surface which is covered with snow, and a road surface which is covered with ice.

12. The method according to claim 1, further comprising:
determining said classification of the road surface by
combining image information related to said reference
surface in the form of light intensity values from said
Lidar unit and light intensity values, corresponding to
a number of colors or color ranges, from said RGB
sensor.

13. The method according to claim 1, further comprising:
using color data in three channels in the form of different
wavelength intervals generated by said RGB sensor, in
said determining said classification of the road surface.

14. The method according to claim 13, further comprising:
using additional color data in a fourth channel corresponding to 980 nm.

15. An arrangement for determining a classification of a
condition of a road surface for vehicle traffic and within a
reference surface of said road surface ahead of the vehicle,
said arrangement comprising:
at least one light source positioned on said vehicle and
being configured to illuminate said reference surface;
a sensor configured to detect light which is reflected off
said reference surface;
a light unit configured to illuminate said reference surface;
a Lidar unit configured to provide image information
related to said reference surface by detecting said
reflected light;

an RGB sensor configured to provide further image
information related to said reference surface by scanning said reference surface by the RGB sensor; and
a controller configured to determine said classification of
the road surface by combining image information
related to said reference surface from said Lidar unit
and said RGB sensor by
defining a first image of the road surface by the image
information provided by the Lidar unit,
defining a second image of said road surface by the
additional image information provided by the RGB
sensor, and
defining a combined image from the first and second
images.

16. The arrangement according to claim 15, wherein the
controller is configured to determine which of the following
conditions applies to the road surface:
a dry and non-covered road surface,
a road surface which is covered with water,
a road surface which is covered with snow, and
a road surface which is covered with ice.

17. A vehicle comprising:
the arrangement for classification of a condition of the
road surface according to claim 15.

* * * * *